United States Patent [19]
Smith et al.

[11] 3,842,595
[45] Oct. 22, 1974

[54] MODULAR GAS TURBINE ENGINE

[75] Inventors: James Smith, Topsfield; John Kenneth Baxter, Jr., Marblehead, both of Mass.

[73] Assignee: General Electric Company, Lynn, Mass.

[22] Filed: Dec. 26, 1972

[21] Appl. No.: 318,179

[52] U.S. Cl............ 60/39.36, 60/39.75, 60/39.32, 415/172, 415/189, 415/191, 415/202, 416/198
[51] Int. Cl......... F02c 3/06, F02c 7/06, F02c 7/20
[58] Field of Search............ 60/39.36, 39.75, 39.31, 60/39.32; 415/171, 172, 217, 218, 189, 190, 202, 185, 191; 416/198, 200, 201

[56] References Cited
UNITED STATES PATENTS

| | | | |
|---|---|---|---|
| 2,427,614 | 9/1947 | Meier | 416/201 |
| 2,621,018 | 12/1952 | Barrett | 416/201 |
| 2,851,246 | 9/1958 | Nichols | 415/190 X |
| 2,916,874 | 12/1959 | Worobel | 415/190 X |
| 2,972,470 | 2/1961 | McCormick | 415/190 |
| 3,067,980 | 12/1962 | Welsh | 416/201 |
| 3,295,825 | 1/1967 | Hall | 416/198 X |
| 3,372,542 | 3/1968 | Sevetz | 60/39.36 |
| 3,565,545 | 2/1971 | Bobo et al. | 60/39.66 |
| 3,575,528 | 4/1971 | Beam et al. | 415/115 |
| 3,745,628 | 7/1973 | Stahl | 416/198 X |

FOREIGN PATENTS OR APPLICATIONS

| | | | |
|---|---|---|---|
| 572,865 | 3/1959 | Canada | 415/190 |
| 4,511,642 | 9/1966 | Japan | 416/198 |

*Primary Examiner*—William L. Freeh
*Assistant Examiner*—Robert E. Garrett

[57] ABSTRACT

A modular gas turbine engine for an aircraft includes a cold module, a combustion liner assembly, a nozzle diaphragm assembly, and a gas generator turbine module, all of which may be readily removed and replaced in the field without the use of special tools. The invention herein described was made in the course of, or under a contract or subcontract thereunder (or grant), with the Department of the Army.

8 Claims, 7 Drawing Figures

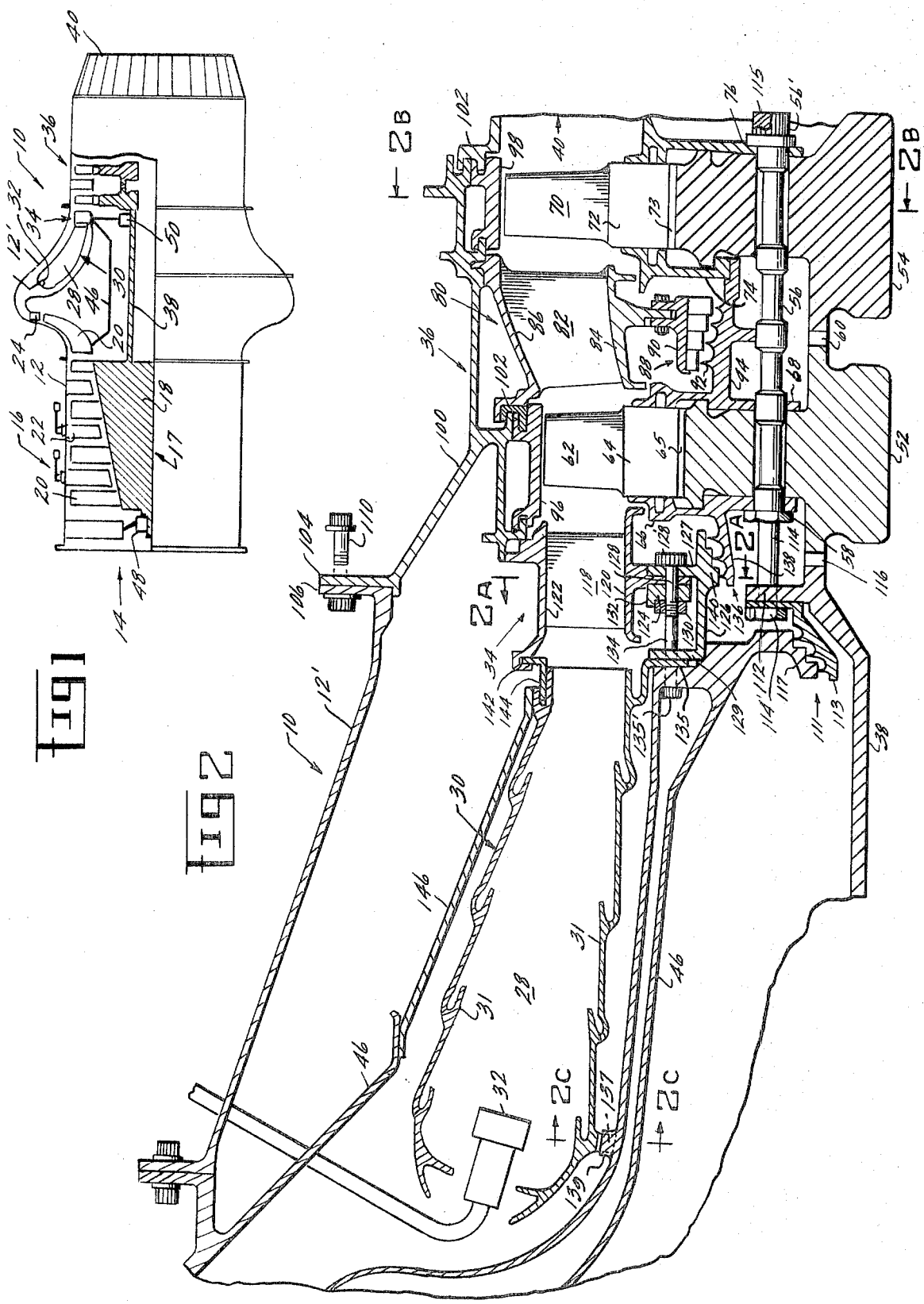

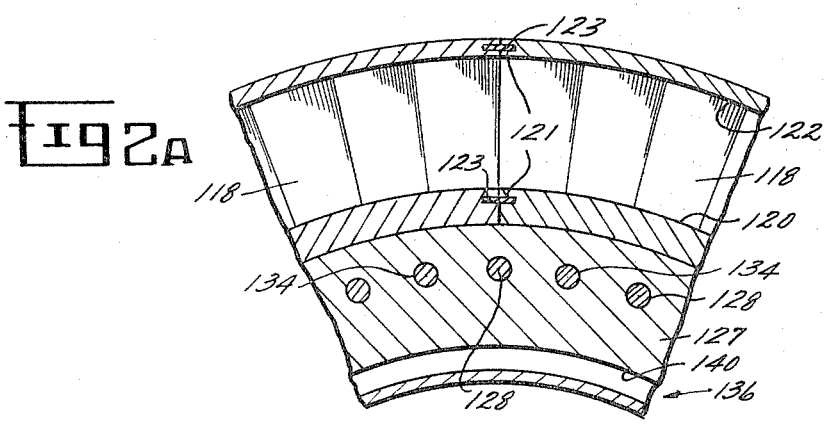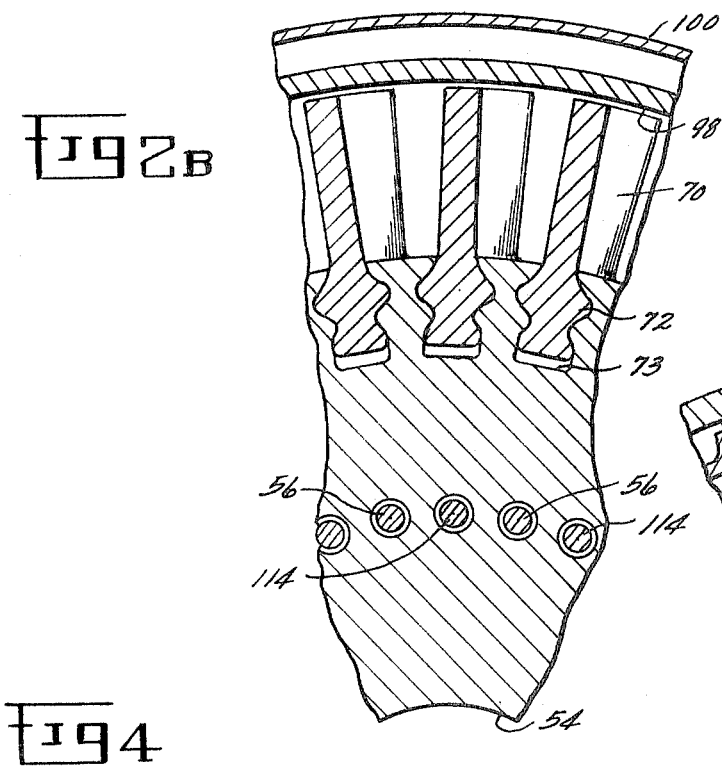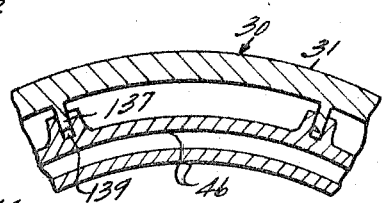

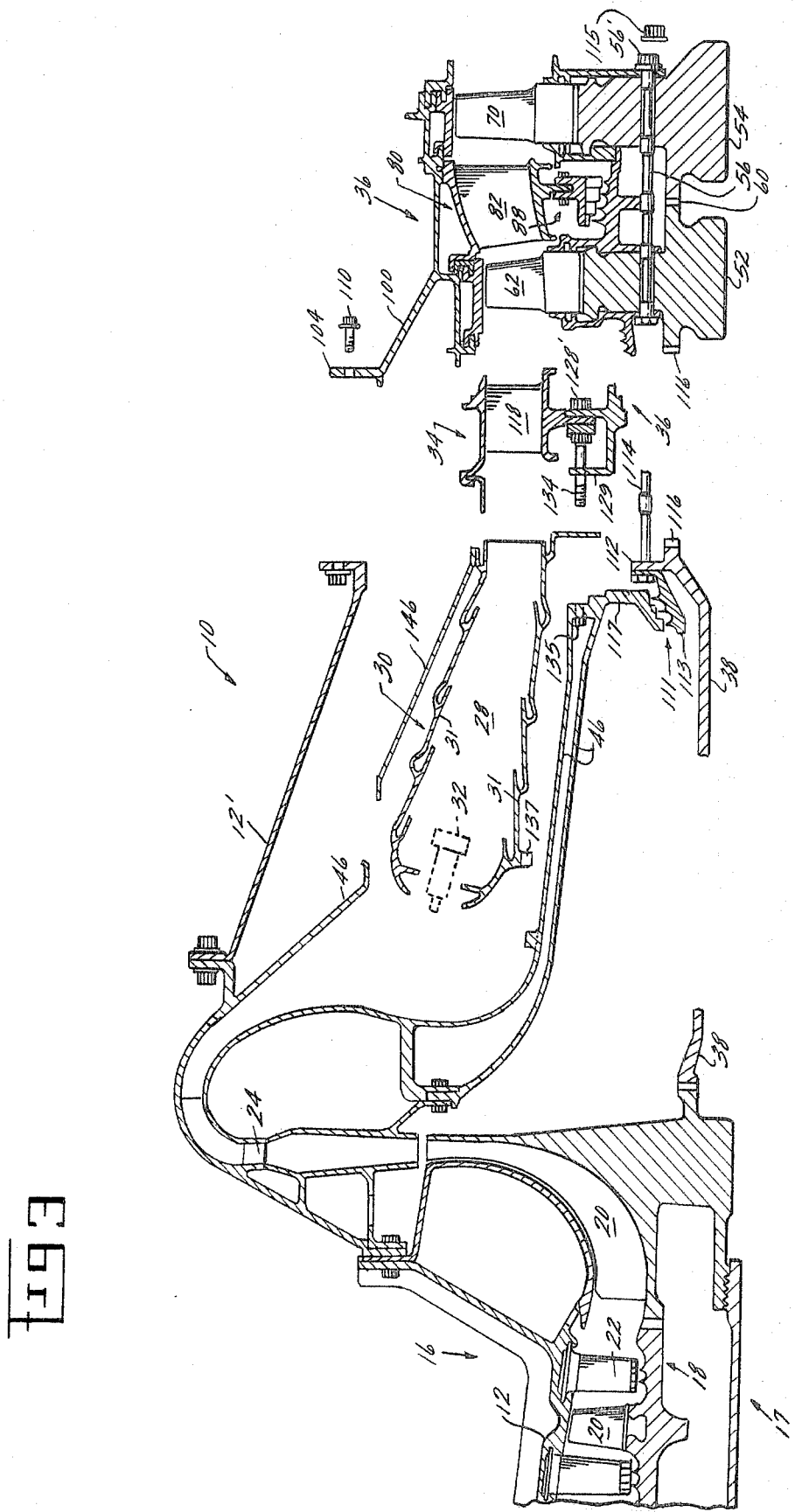

MODULAR GAS TURBINE ENGINE

BACKGROUND OF THE INVENTION

This invention relates to a modular gas turbine engine and, more particularly, to a modular aircraft gas turbine engine having a cold module, a combustion liner assembly, nozzle diaphragm assembly, and a gas generator turbine module, all of which may be removed and replaced utilizing only the tools found in a standard Army AO7 tool box.

It has been a recent objective of the United States Army to develop a low cost, reliable and easily maintained aircraft to replace today's UH-1 "Huey" helicopter. The aircraft will have a VTOL capability and be designed primarily to carry a combat equipped infantry squad of 11 men and a three man crew; however, it may also be utilized to provide logistics support and serve as an aerial command post and ambulance.

Of primary importance to the Army is the maintainability of the aircraft engines which, due to the VTOL capability of the aircraft, will be utilized in areas where conventional airfields are nonexistent, such as in combat zones and in other isolated areas. Under these and related conditions, the aircraft engines will be subject to the ingestion of substantial quantities of small foreign objects such as sand and dust particles, and thereby incur a substantially increased risk of foreign object damage. Therefore, the aircraft engines must be readily repairable in combat zones and other isolated areas away from airfields and service shops where manpower may be limited and where the only tools available may be those generally found in a standard Army AO7 tool box.

Therefore, it is a primary object of this invention to provide a gas turbine engine with modular components wherein the individual modular components may be readily removed and replaced in the field by a two man team without the need for special tools.

It is also an object of this invention to provide a modular aircraft gas turbine engine having a cold module, a combustion liner assembly, nozzle diaphragm assembly, and a gas generator turbine module, all of which may be readily removed and replaced in the field using only the tools found in the standard Army AO7 tool box.

SUMMARY OF THE INVENTION

A modular gas turbine engine includes a cold module which has an outer casing open at one end to provide an airflow inlet. The cold module outer casing extends rearwardly to form a combustor outer casing. A frame is disposed within the cold module together with a shaft journaled for rotation with respect to the frame. The cold module also includes a compressor which receives and pressurizes an inlet airflow for delivery to a combustion liner assembly within which the pressurized airflow is mixed with an inlet flow of fuel and ignited to produce a high energy gas stream. A nozzle diaphragm assembly receives and directs the high energy gas stream from the combustion liner assembly and includes a plurality of arcuate segments assembled on a circumferential support ring to form a flow annulus. The nozzle diaphragm assembly may be attached to the frame by a first plurality of circumferentially spaced apart bolts which pass through and engage the support ring. A gas generator turbine module is also included which receives the high energy gas stream from the nozzle diaphragm assembly and drives the compressor through the shaft. The turbine module is maintained in axially spaced engaged relation to the shaft by a second plurality of circumferentially spaced apart bolts which pass through the turbine module and torque is transmitted from the turbine module to the shaft through an interconnecting curvic coupling.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view, partly in cross-section, of the modular gas turbine engine of this invention.

FIG. 2 is a cross-sectional view of a portion of the modular gas turbine engine of FIG. 1.

FIG. 2A is a partial cross-sectional view along the line 2A — 2A of FIG. 2.

FIG. 2B is a partial cross-sectional view along the line 2B — 2B of FIG. 2.

FIG. 2C is a partial cross-sectional view along the line 2C — 2C of FIG. 2.

FIG. 3 is a cross-sectional exploded view of a portion of the modular gas turbine engine of FIG. 1.

FIG. 4 is a cross-sectional view of an alternate arrangement for a portion of the modular gas turbine engine of FIG. 1.

DESCRIPTION OF THE PREFERRED EMBODIMENT

Referring to FIG. 1, there is shown a gas turbine engine 10 having a cold module 16 within an outer casing 12 which is open at one end to provide an inlet 14 and which extends rearwardly to form a combustor outer casing 12'. Ambient air enters the cold module 16 through inlet 14 and is compressed by a compressor 17 which may be of the axial-centrifugal flow type. Compressor 17 includes a rotor 18 from which extend a number of axially spaced apart rows of rotor blades 20 interdigited between rows of axially spaced apart stator vanes 22 which may be of the variable type. Pressurized air is discharged from the cold module 16 through a plurality of circumferentially spaced apart diffuser vanes 24 through which the compressed air is diffused prior to entering a combustion chamber 28. Combustion chamber 28 is defined by a combustion liner assembly 30 and receives an inlet flow of fuel through a plurality of circumferentially spaced apart fuel nozzles 32. The high pressure air and fuel mixture is ignited to produce a high energy gas stream which exits from the combustion chamber 28 through a nozzle diaphragm assembly 34. High energy gas from the nozzle diaphragm assembly 34 then drives a gear generator turbine module 36 which connects to the compressor rotor 18 through a shaft 38. It will thus be appreciated that the gas turbine engine 10 so far described could be utilized as a gas generator in combination with a power turbine, not shown, to form a turboshaft engine which may be connected to drive the rotor blades of a helicopter, also not shown. It will also be appreciated that the gas turbine engine 10 may be utilized as a gas generator in a turbofan engine or turboprop engine. The cold module 16 also includes a frame 46 within which the shaft 38 is journaled for rotation by a forward bearing housed within a sump 48 and an aft bearing housed within a sump 50. There may also be provided an exhaust nozzle 40 which may be of the variable type.

Referring now to FIGS. 2, 2A, 2B, and 2C, the turbine module 36 is shown in greater detail as including a forward rotor disc 52 spaced axially apart from aft rotor disc 54. The forward and aft rotor discs 52, 54 are maintained in axially spaced abutting relation by a plurality of circumferentially spaced apart elongated bolts 56 each of which has an integral bolt head 56' formed at one end thereof and is threadably engaged by a locknut 58 at the opposing end thereof. Torque is transmitted between the forward and aft rotor discs 52, 54 through a toothed coupling 60. Thus, it should be appreciated that the elongated bolts 56 operate only to maintain the rotor discs 52, 54 in axially engaging relation and do not operate to transfer torque between the rotor discs. Because torque is not transferred by the bolts 56, clearances between the bolts 56 and their respective holes in the rotor discs 52, 54 may be enlarged to permit easy insertion of the bolts therethrough. The bolts 56 may also be tightened with the small torque wrench found in a standard Army AO7 tool box.

The forward box rotor disc 52 includes a plurality of circumferentially spaced apart airfoil type blades 62 disposed about the periphery thereof. Each airfoil type blade 62 includes an inner root portion 64 which may engage an axially extending dovetail slot 65 in the rotor disc 52 in a manner well known to the turbine art. Blades 62 may be restrained from forward and aft axial motion within their respective dovetail slot 65 by engagement of a forward circumferential seal ring 66 and an aft circumferential seal ring 68. In like manner, the aft rotor disc 54 also includes a plurality of circumferentially spaced apart airfoil type blades 70 disposed about the periphery thereof. Each blade 70 also includes a root portion 72 which may be engaged by an axially extending dovetail slot 73. Blades 70 are restrained from forward and aft axial motion within their respective dovetail slots 73 by engagement of a forward circumferential seal ring 74 and an aft circumferential seal ring 76.

Disposed intermediate the forward and aft rotor discs 52, 54 there is provided a nozzle diaphragm shown generally at 80. The nozzle diaphragm 80 includes an inner circumferential support ring 84 from which extend radially outward a plurality of circumferentially spaced apart vanes 82 wherein the outer radial ends of the vanes 82 are engaged by a circumferential shroud member 86. Nozzle diaphragm 80 may be composed of a plurality of individual arcuate segments arranged to form a flow annulus, as is well known in the turbine art. Gas flow leakage around the nozzle diaphragm 80 is prevented by a flow seal 88 of the labyrinth type. Flow seal 88 includes a stator member 90 engaged by the teeth 92 of a rotational member 94 which may be formed integral to the seal ring 68. The forward rotor blades 62 are circumscribed by an outer shroud 96 which may be of the honeycomb type as is well known in the art. In like manner the aft rotor blades 70 are also circumscribed by an outer shroud 98 which may also be of the honeycomb type. U-shaped circumferential seal rings 102 are further provided to prevent leakage of the high energy gas stream from the turbine module 36. Shrouds 96, 98 and nozzle diaphragm 80 are maintained in fixed serial flow relation by inter-engagement with a turbine module casing 100. Module casing 100 is maintained in fixed relation relative to the casing 12' by an integral radially extending circumferential flange 104 which is maintained in abutting relation to a radially extending circumferential flange 106, formed integral to casing 12'. Flanges 104, 106 are maintained in fixed juxtaposition by a plurality of circumferentially spaced apart locking bolts 110.

The turbine module 36 is also fixedly connected to the rotor shaft 38 by a plurality of circumferentially spaced apart elongated bolts 114 interspaced between the bolts 56 and threadably engaged at the aft ends by locknuts 115. The elongated bolts 114 engage the shaft 38 through a radially extending circumferential flange 112 which is formed integral to the aft end of the shaft 38. Again, the bolts 114 serve only to maintain the rotor discs 52, 54 and shaft 38 in spaced axially engaged relation with torque being transmitted through a toothed coupling 116. Because the bolts 114 also do not transmit torque, clearances between the bolts and their respective holes may be enlarged to permit easy insertion of the bolts therethrough. The bolts 114 may also be tightened with the small torque wrench found in a standard Army AO7 tool box.

A flow seal 111 of the labyrinth type is provided between the turbine module 36 and the engine frame 46 and includes a stator member 117 formed integral to the frame 46 engaged by the teeth of a rotating member 113 which may be maintained for rotation with the shaft 38 by bolts 114. Rotating member 113 engages a flat edge of each bolt head 114' so as to permit tightening or loosening of the nuts 115 without rotating the bolts 114.

The nozzle diaphragm assembly 34 includes a plurality of arcuate segments assembled on a U-shaped circumferential support ring 126 to form a flow annulus. Each arcuate nozzle segment includes an inner arcuate shroud segment 120 from which extend radially outward a plurality of circumferentially spaced apart vanes 118 into engagement with an outer arcuate shroud segment 122. The ends of the inner and outer shroud segments 120, 122 are slotted to 121 to receive seal strips 123, as seen in FIG. 2A. Each inner arcuate shroud segment 120 includes an integral flange segment 124 extending radially inward therefrom into abutting engagement with a circumferential aft flange 127 extending radially outward from the U-shaped support ring 126. A plurality of circumferentially spaced apart elongated bolts 128, each one of which has an integral bolt head 128' formed at one end thereof and is threadably engaged at the opposing end thereof by a locknut 130, operate to maintain the arcuate flange segments 124 in attachment to flange 127 of the support ring 126. In order to reduce flow leakage between the arcuate nozzle segments, there may be also provided a circumferential seal ring 132 engaged by the elongated bolts 128. The U-shaped support ring 126 includes a forward radially outward extending circumferential integral flange 129 which engages the cold module frme 46. Support ring 126 is maintained in fixed connection to the cold module frame 46 by a plurality of circumferentially spaced apart elongated bolts 34 threadably engaged by locknuts 135' wherein the bolts 134 are interspaced between the bolts 128 and extend through the forward and aft flanges 129, 127 of the support ring 126. Between the nozzle diaphragm assembly 34 and the turbine module 36 there is provided a flow seal 136 having a stator member 140 engaged by the teeth of a rotating member 138 which may be formed integral to the seal ring 66. The outer arcuate shroud segments 122 include a radially extending groove 142 at the forward end thereof for retention of a circumferential seal ring 144 which engages the aft end of the combustion liner assembly 30.

The combustion liner assembly 30 includes a combustion liner 31 to which there is attached a circumferential retaining ring 146 for sliding connection to the cold module frame 46. The combustion liner assembly 30 also includes a circumferential lip 135 extending radially inward from the aft edge thereof for axially locating the combustion liner assembly 30 relative to the frame 46. Radial restraint of the combustion liner assembly 30 relative to the cold module frame 46 is provided by a plurality of circumferentially spaced apart tangs 137 extending radially inward from the assembly 30 into engagement with a plurality of correspondingly spaced apart slots 139 in the frame 46 as best seen in FIG. 2C.

Referring now to FIG. 3, there is shown the gas turbine engine 10 of this invention with the modules and assemblies broken apart as would be required in order to gain access to the combustion chamber 28 to repair or replace a damaged combustor liner 31.

The first step in disassembling the engine 10 is to remove the turbine module 36 which may be accomplished simply by loosening and removing both the bolts 110 and the retaining nuts 115. After the bolts 110 and the retaining nuts 115 have been loosened and removed, the turbine module 36 may be retracted as shown. Since the transmission of torque from the turbine module 36 to shaft 38 is accomplished through the tooth coupling 116 and not through the elongated bolts 114, the nuts 115 may be loosened with a standard box or socket wrench and thereafter tightened with the small torque wrench generally found in the standard Army AO7 tool box. Also, the clearances between the bolts 114 and their respective holes may be made sufficiently large to facilitate ready removal of the turbine module without the use of special pullers. Once the turbine module 36 has been removed, it can either be replaced in its entirety as will likely be the case for an emergency repair performed during actual combat conditions, after which the damaged turbine module could be returned to a service shop for further breakdown and repair of the individual module components.

After removal of the turbine module 36, it is a simple matter to remove the nozzle diaphragm assembly 34 by loosening and removing elongated bolts 134. After bolts 134 have been loosened and removed, the nozzle diaphragm assembly 34 may be retracted as shown in FIG. 3. Again, no special tooling would be required to loosen the bolts 134 and the nozzle diaphragm assembly 34 may be replaced in its entirety in the same manner as the turbine module 36. A damaged nozzle diaphragm assembly 34 may be returned to a service shop and further broken down into its individual arcuate segments by removal of the bolts 128. Seal ring 144 separates from the combustion liner assembly 30 and is withdrawn therefrom by retraction of the nozzle diaphragm assembly 34. After the nozzle diaphragm assembly 34 is retracted, it is a simple matter to remove and replace the combustion liner assembly 30 by just withdrawing the combustion liner assembly 30 in an axially aft direction, as shown in FIG. 4. Again, no special tooling is required to remove the combustion liner assembly 30, although it would be first necessary to remove the igniter plugs (not shown).

After removal of the combustion liner assembly 30 there will remain the cold module 16 which may also be replaced in its entirety. It will be further appreciated that the shaft 38 remains journaled for rotation with respect to the cold module frame 46 and that the forward and aft bearings together with their associated sumps 48, 50 remain intact as an integral part of the cold module 16 even after the turbine module 36, nozzle diaphragm assembly 34, and combustion liner assembly 30 have been removed. Therefore, all the modules and assemblies which comprise the gas generator may be removed and replaced without having to break apart or disassemble a single bearing or bearing sump. Thus it will be further appreciated that the engine may be reassembled in like manner by reversing the process, as previously described.

Also, the location of the retaining bolts 114 outside the circumference of the toothed couplings 60, 116 is by itself a significant departure from conventional engine designs and facilitates the critical sizing of the turbine components which make possible a real and practical gas turbine engine embodying the modular design here in described.

Referring now to FIG. 4, where like numerals designate previously described elements, there is shown an alternate arrangement for the nozzle diaphragm assembly 34' wherein the U-shaped circumferential support ring 126 has been replaced by a circumferential support ring 156 having a forward integral circumferential flange 158 extending radially inward and an aft integral circumferential flange 160 extending radially outward. A plurality of circumferentially spaced apart elongated bolts 128, each one of which has an integral bolt head 128' formed at one end thereof and is threadably engaged at the opposing end thereof by a locknut 130, operate to maintain the arcuate flange segments 124 in attachment to flange 160 of the support ring 156. In order to reduce flow leakage between the arcuate nozzle segments, there may again be provided a circumferential seal ring 132 engaged by the elongated bolts 128. The support ring 156 is maintained in fixed connection to the frame 46 by a plurality of circumferentially spaced apart elongated bolts 162 threadably engaged by locknuts 164 wherein the bolts 162 extend through only the forward flange 158 of the support ring 156. The nozzle diaphragm assembly herein described may be removed by simply loosening and retracting the bolts 162 which again may be accomplished with only the tools found in a standard Army tool box.

Thus having described preferred embodiments of the invention, though not exhaustive of all possible equivalents, what is desired to be secured by Letters Patent is claimed below.

What is claimed is:

1. A modular gas turbine engine comprises:
    a cold module which includes a casing open at one end to provide an inlet and extending rearwardly to form a combustor outer casing, a frame disposed within the cold module, a shaft journaled for rotation within the frame by bearings located entirely within the cold module, and a compressor which receives and pressurizes an inlet airflow;
    a combustion liner assembly for receiving the pressurized airflow from the compressor, together with an inlet flow of fuel within the high pressure air and fuel mixture is ignited to produce a high energy gas stream;

a nozzle diaphragm assembly for receiving and directing the high energy gas stream from the combustion chamber wherein the nozzle diaphragm includes a plurality of arcuate segments assembled on a circumferential support ring to form a flow annulus which may be attached to the engine frame by a first plurality of circumferentially spaced apart bolts which pass through and engage the support ring; and a turbine module which receives the high energy gas stream from the nozzle diaphragm assembly and is drivably connected to the compressor through the shaft wherein the turbine module includes at least one rotor disc which is maintained in axially spaced engaged relation to the aft end of the shaft by a second plurality of circumferentially spaced apart bolts which pass through the entire turbine module thus facilitating ready access to the second plurality of bolts from the aft end thereof in order to permit intact removal and replacement of the turbine module from the aft end of the engine without removing a bearing or any portion thereof and wherein torque is transmitted from the turbine module to the shaft through an interconnecting toothed coupling, and wherein the turbine module includes a forward and an aft rotor disc maintained in axially spaced abutting relation by a third plurality of circumferentially spaced apart elongated bolts extending therethrough in interspaced relation to the second plurality of bolts with torque transfer between the forward and aft rotor discs accomplished through an interconnecting tooth coupling.

2. The gas turbine engine of claim 1 wherein the second plurality of bolts is disposed outside the circumference of the toothed coupling.

3. The gas turbine engine of claim 2 wherein the turbine module includes a casing having a generally radially extending circumferential flange which may be attached to a second generally radially extending circumferential flange from the cold module casing by a fourth plurality of circumferentially spaced apart bolts extending therethrough.

4. The gas turbine engine of claim 3 wherein there is further included a nozzle diaphragm intermediate the forward and aft rotor discs and in attachment to the turbine module casing such that the turbine module may be removed in its entirety from the aft end of the cold module by loosening and removing the second and fourth plurality of bolts.

5. The gas turbine engine of claim 3 wherein the support ring is an integral annulus and each arcuate segment of the nozzle diaphragm assembly includes an inner arcuate shroud segment from which extend radially outward a plurality off circumferentially spaced apart vanes into engagement with an outer arcuate shroud segment and wherein each inner arcuate shroud segment includes an integral arcuate flange segment extending radially inward therefrom into abutting engagement with a circumferential flange extending radially outward from the support ring together with a fifth plurality of circumferentially spaced apart bolts extending through the arcuate flange segments and the support ring circumferential flange so as to maintain their abutting relation and further including a circumferential seal ring engaged by the fifth plurality of bolts to reduce the flow leakage between the arcuate nozzle segments wherein the nozzle diaphragm may be removed and replaced intact from the aft end of the engine after the turbine module has been removed.

6. The gas turbine engine of claim 5 wherein the support ring includes a forward circumferential integral flange for engagement with the cold module frame and through which the first plurality of bolts extend.

7. The gas turbine engine of claim 3 wherein there is included a flow seal between the nozzle diaphragm assembly and turbine module having a stator member attached to the circumferential support ring and engaged by the teeth of a rotating member attached to the turbine module such that the rotating member may be readily withdrawn with the turbine module in an axially aft direction and wherein there is also included a flow seal between the shaft and cold module frame having a second stator member attached to the frame and engaged by the teeth of a second rotating member attached to the shaft such that the rotating member may be readily withdrawn with the turbine in an axially aft direction.

8. The gas turbine engine of claim 1 wherein the combustion liner assembly includes a circumferential lip extending radially inward from the aft edge thereof for axially locating the combustion liner assembly relative to the frame.

* * * * *